(12) United States Patent
Leibundgut

(10) Patent No.: US 6,315,453 B1
(45) Date of Patent: Nov. 13, 2001

(54) LIQUID LUBRICATED RADIAL SLIDING BEARING

(75) Inventor: Erwin Leibundgut, Winterthur (CH)

(73) Assignee: Sulzer Pumpen AG, Winterthur (CH)

( * ) Notice: Subject to any disclaimer, the term of this patent is extended or adjusted under 35 U.S.C. 154(b) by 0 days.

(21) Appl. No.: 09/353,740

(22) Filed: Jul. 14, 1999

(30) Foreign Application Priority Data

Jul. 16, 1998 (EP) .................................................. 98810682

(51) Int. Cl.[7] ...................................................... F16C 17/02
(52) U.S. Cl. .......................................... 384/202; 384/215
(58) Field of Search ................................. 384/202, 213, 384/192, 205

(56) References Cited

FOREIGN PATENT DOCUMENTS

| | | |
|---|---|---|
| 153952 | 10/1903 | (DE) . |
| 1266570 | 4/1968 | (DE) . |
| 3613776A1 | 10/1987 | (DE) . |
| 3728039A1 | 3/1989 | (DE) . |
| 0204235B1 | 12/1986 | (EP) . |
| WO 93/22575 | 11/1993 | (WO) . |

*Primary Examiner*—Lenard A. Footland
(74) *Attorney, Agent, or Firm*—Townsend and Townsend and Crew LLP

(57) ABSTRACT

With the invention liquid lubricated radial sliding bearings are shown, of which the bearing sleeve is elastically fastened in an outer part and forms an elastic journalling with a shaft part which can follow thermal heat expansions and inclined positions of the shaft to a limited extent. Because the bearing material is fastened in a bearing ring and the outer part is formed in a single part to a resilient ring and a support ring which has resilient support surfaces which are directed inwardly and at which the bearing ring lies under a bias force, elastic bearings for high and low temperatures and for differently corrosive lubrication liquids are possible with the same outer dimensions.

12 Claims, 3 Drawing Sheets

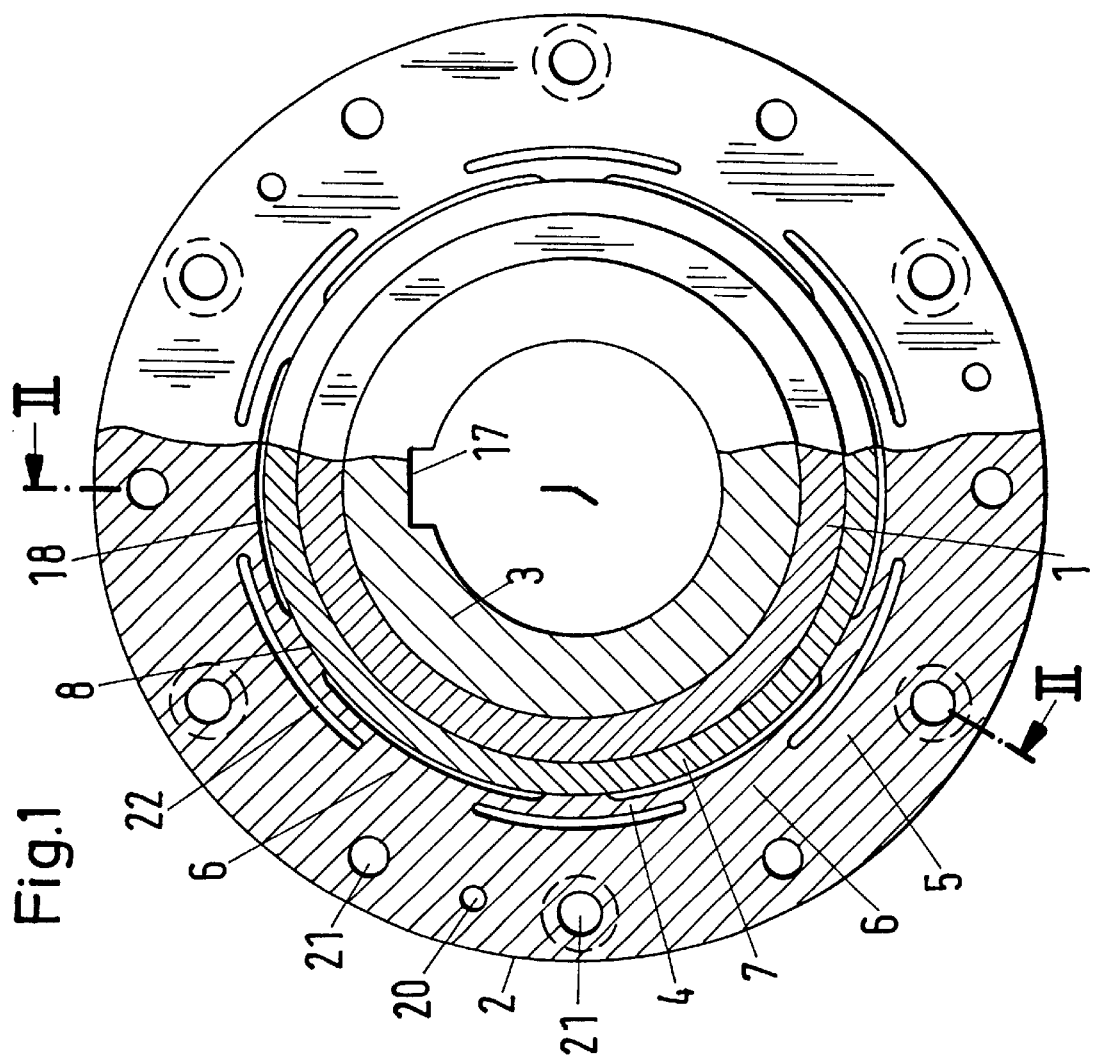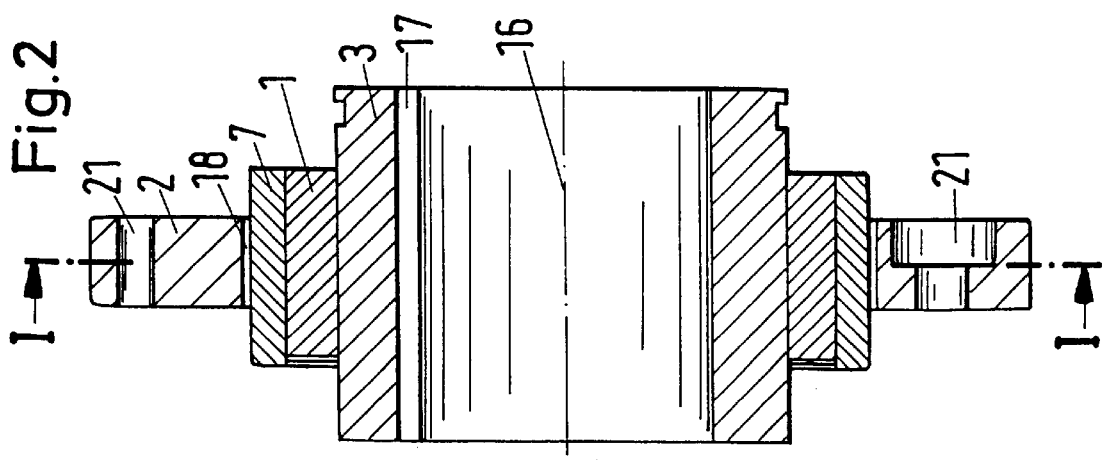

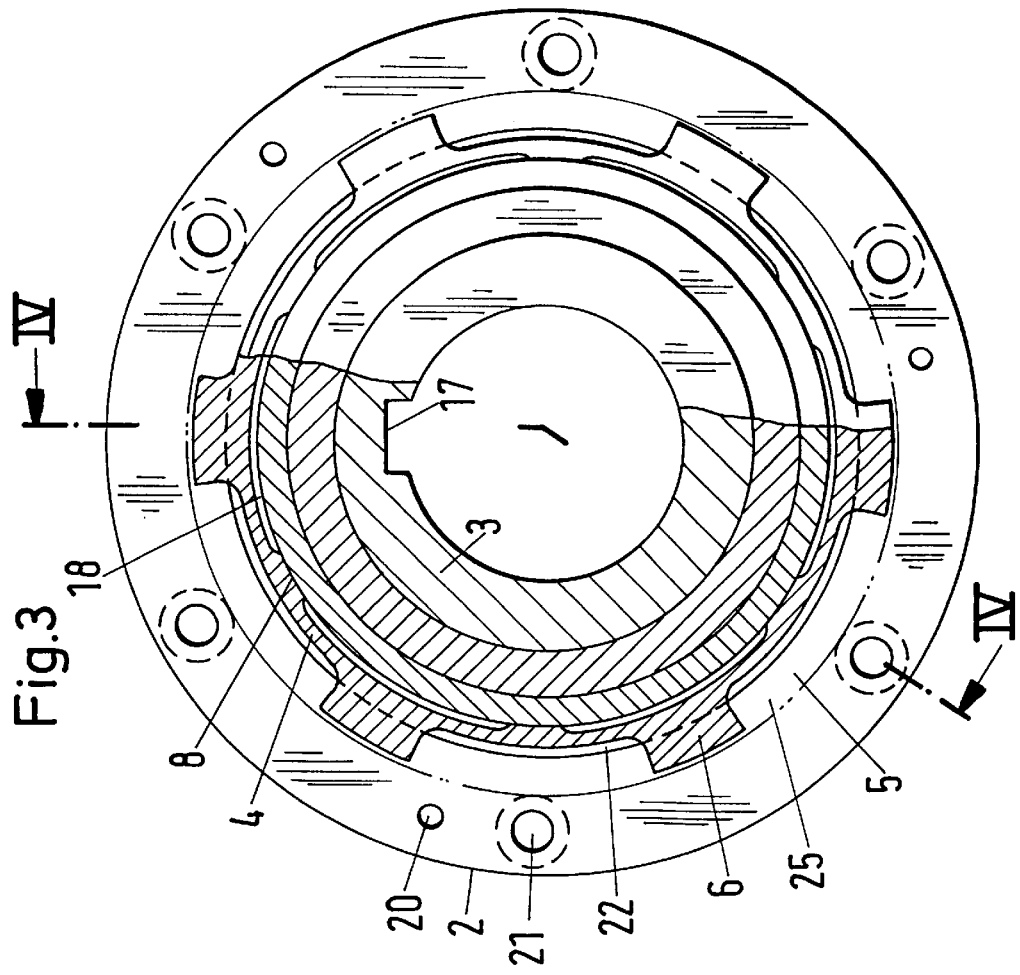
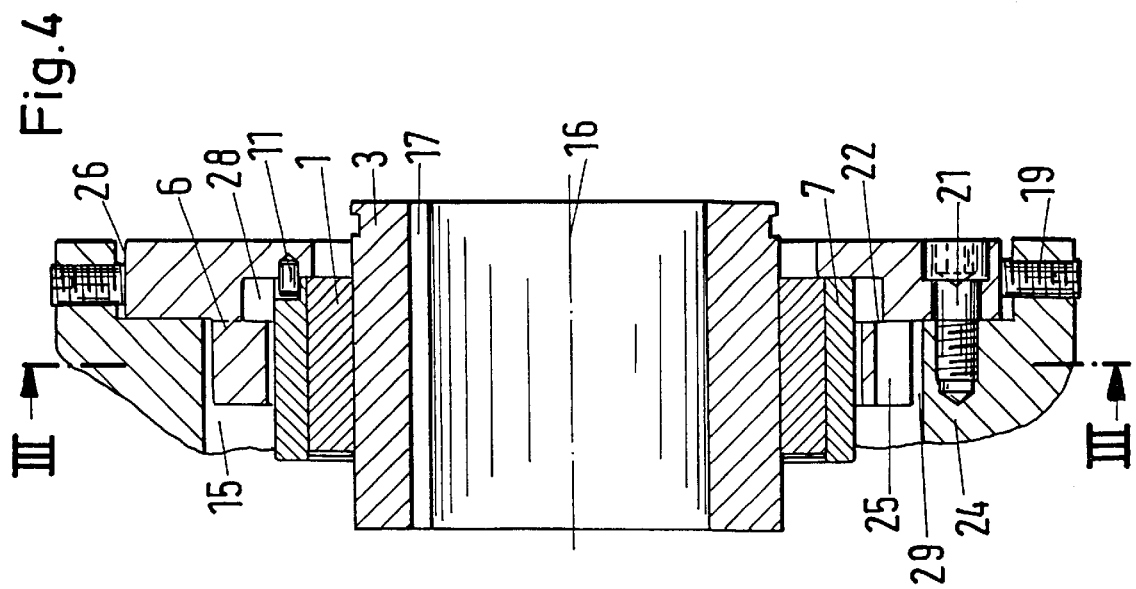

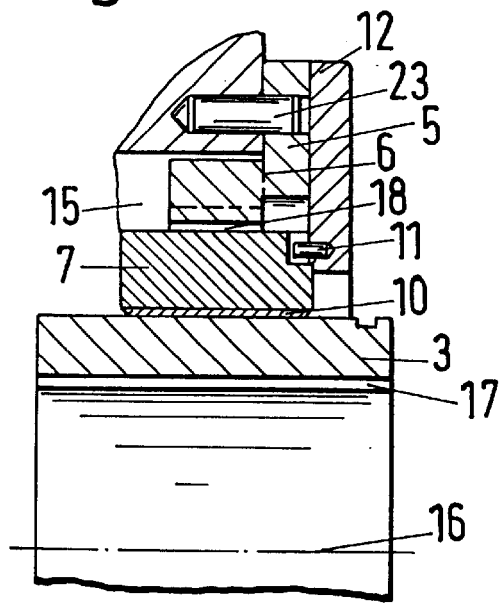
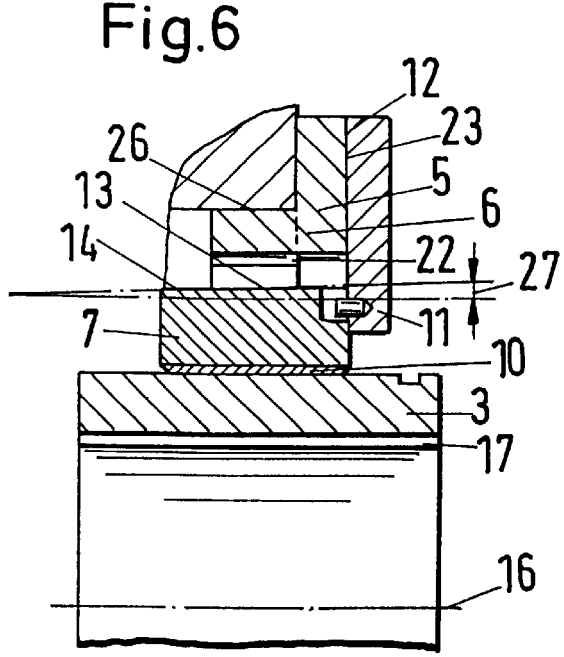
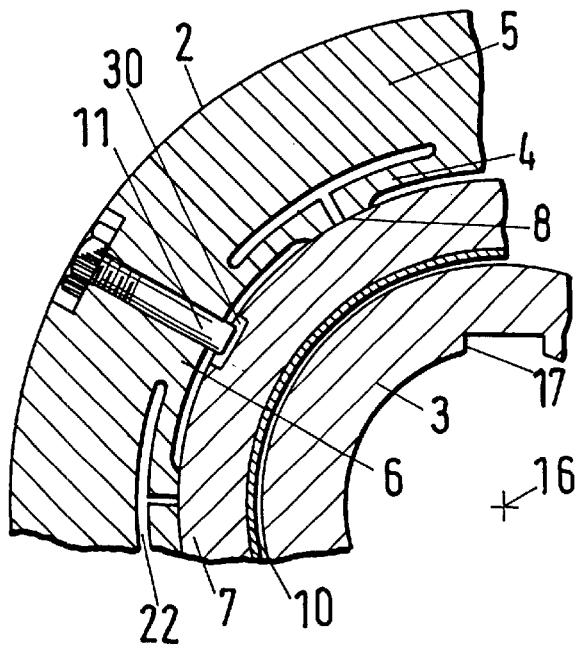
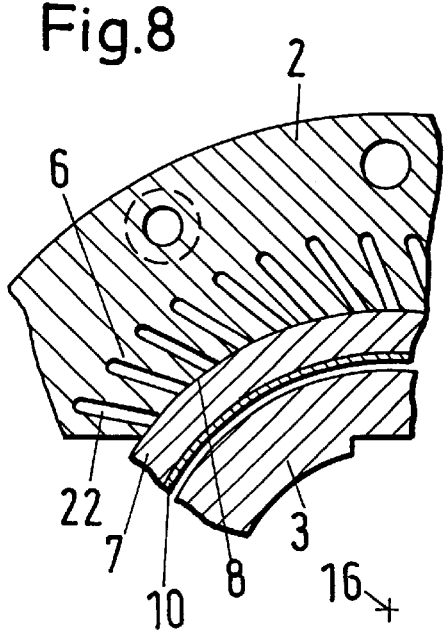

LIQUID LUBRICATED RADIAL SLIDING BEARING

BACKGROUND OF THE INVENTION

1. Field of the Invention

The invention relates to a liquid lubricated radial sliding bearing comprising a bearing sleeve of wear-resistant bearing material which is elastically fastened in an outer part and which together with a shaft part forms an elastic journalling which can follow thermal heat expansions and inclined positions of the shaft to a limited extent.

2. Description of the Prior Art

In EP-B-0 204 235 a bearing with a bearing sleeve of silicon carbide is shown in which a further shaft sleeve runs, which rotates with the shaft. The bearing sleeve is outwardly covered over by an elastic rubber hose, which additionally engages into grooves on its jacket surface and is fastened at the outside with an adhesive bonding in a housing bore in the housing. The elasticity of the intermediate layer of rubber is intended to prevent over-stressing due to bending deflections of the shaft, thrusts or inclined positions. Due to the use of rubber and an adhesive bonding, an application for all kinds of water is envisaged. The use of rubber restricts the range of application of a bearing of this kind. Solvents and aging can strongly modify the elastic properties of rubber; softening, hardening or becoming brittle can take place.

A further construction is shown by the CERATEC company (Technical Ceramics BV, P. O. Box 57, 4190 CB Geldermalsen, The Netherlands) in its brochure of May 1997 for compact sliding bearings. Shown are ceramic sliding pairings in which ceramic bearing sleeves and shaft sleeves are in each case embedded in a support ring. In the jacket surface of the support rings, U-shaped slits are provided and U-shaped lobes are cut free at which the ceramic bearing sleeves and shaft sleeves lie in contact in order to compensate different thermal expansions. The cutting free of the U-shaped lobes must be done with spark-erosive wire cutting or spark-erosively with electrodes of thin U-shaped cross-section, which in both cases is a time consuming and expensive treatment. The length of the slits to be produced by spark erosion is substantially greater than the bearing circumference. Methods other than spark erosion do not make the manufacture of these slits less expensive. Furthermore, direct pressure peaks are present at the ceramic bearing sleeves and shaft sleeves which alternate with pressure-less zones, and at positions of greater inclination diagonally displaced pressure points arise at the ceramic sleeves.

SUMMARY OF THE INVENTION

The object of the invention is to achieve an elastic bearing suspension in which the stiffness of the suspension can be predetermined and remains unchanged. The bearing material is fastened in a bearing ring; wherein the outer part is formed in a single part to a resilient ring and a support ring, with the resilient ring being braced at the support ring by bridges which are distributed over its periphery and have resilient support surfaces which are directed inwardly and at which the bearing ring lies in contact under a bias force.

This arrangement has the advantage that a sufficiently elastic bearing suspension is achieved with metallic materials and brittle bearing materials such as ceramics, hard materials and, for example, silicon carbide can be used. Bearings of this kind are advantageous in multiply journalled shafts such as, for example, in vertical pumps and in single or multiple stage centrifugal pumps. With this construction, an elastic bearing suspension can be achieved both at high temperatures and at low temperatures.

In a resilient ring which is closed uninterruptedly, drawing tensions can be produced for the clamping in position of the bearing ring.

The radial forces which are produced via these drawing tensions cancel out over the periphery of the bearing ring so that a controlled radial stiffness of the bearing arises in spite of a large force transmission between the resilient ring and the bearing ring. The arrangement and length of the bridges between the resilient ring and the support ring has an influence on the manufacture and the space requirement. The separating slits between the resilient ring and the support ring should be narrow in order not to require too much space. Narrow slits also increase the passive safety in the event of an accident when the resilient ring strikes against the support ring in the presence of excessive forces. Since the length of all the slits still always turns out to be less than the bearing circumference, these slits can still be produced fairly economically by means of spark erosion.

With an axial displacement in the support ring axially arranged bridges can be produced; and the slits can be manufactured economically by normal turning and milling operations which interpenetrate in the region of the slits. The bearing ring, which accommodates the bearing material, can be executed in different manners. The bearing material, for example a hard material, ceramic or silicon carbide, can be shrunk in. The bearing material can, however, also be applied as a wear resistant layer, for example, in the plasma spraying process. The bearing ring is anchored in the resilient ring with a predetermined bias force. For safety, a rotational securing and an axial securing can be provided between the bearing ring and the outer part. For the simplification of the assembly, the jacket of the bearing ring can be formed as a conical surface and the support surfaces can be formed at the resilient ring as corresponding counter-surfaces in order to produce the bias force of the connection through axial pressing in along the conical surfaces. With a separate flange, the securing against rotation of the bearing ring can also be used as an axial securing of the conical seat. If the outer part is designed as a built in flange which has standard dimensions to the housing, then constructionally similar bearings with different stiffnesses for the suspension of the bearing shell can be manufactured and installed. Metals and metal alloys are provided as a material for the outer part. Other materials are conceivable in so far as they have sufficient strength and elasticity.

BRIEF DESCRIPTION OF THE DRAWINGS

FIG. 1 shows schematically, a plan view in the axial direction with a partial section through a sliding bearing;

FIG. 2 shows schematically, a longitudinal section through the bearing of FIG. 1;

FIG. 3 shows schematically, a bearing analogous to FIG. 1 shows in which the outer part has an axial displacement in order to produce the slits between the resilient ring and the support ring in a chip forming manner;

FIG. 4 shows schematically, a longitudinal section through the bearing of FIG. 3 and its reception in a housing;

FIG. 5 shows schematically, a section of a bearing in which a rotational securing is achieved with a separate flange;

FIG. 6 shows schematically, a section of a bearing in which the bearing ring and the support surfaces have common conical surfaces;

FIG. 7 shows schematically, a section of a bearing with a resilient ring which is cut open; and FIG. 8 shows schematically, an outer part, of which the resilient ring consists of a large number of individual springs which are placed at an inclination to the radial.

DETAILED DESCRIPTION OF THE PREFERRED EXEMPLARY EMBODIMENTS

The figures show liquid lubricated radial sliding bearings, of which the bearing sleeve 1 is elastically fastened in an outer part 2 and forms an elastic journalling with a shaft part 3 which can follow inclined positions of the shaft to a limited extent. Because the bearing material is anchored in a bearing ring 7 and the outer part 2 is formed in a single piece to a resilient ring 4 and a support ring 5 which has resilient inwardly directed support surfaces 8 at which the bearing ring 7 lies in contact, elastic bearings for high and low temperatures and for differently corrosive lubrication liquids are possible with the same outer dimensions.

In the figures, similarly acting parts are provided with the same reference symbols.

In FIGS. 1 and 2 a bearing sleeve 1 is shrunk in in a bearing ring 7. A shaft part 3 is rotatably journalled in the bearing sleeve 1, with a bearing torque being transmittable via spring and groove 17 to a non-illustrated shaft. The outer part 2 is executed in ring shape as a support ring 5 in which bores 21 and threads 20 for the mounting in a housing are provided. Inwardly at the support ring 5 there adjoins a resilient ring 4 which is separated from the support ring 5 via slits 22 and which is connected to the support ring via bridges 6 between the slits and the support ring. The slits 22 and the bridges 6 are uniformly distributed over the periphery, with between three to nine slits 22 and bridges 6 being provided in each case due to the spatially differing acting directions of the bearing forces. The resilient ring 4 has support surfaces 8 towards the inside which in each case lie in the center of the angular region of a slit 22 which is arranged behind it, whereas cut-outs 18 are provided in the angular region between the support surfaces 8. A pressed in bearing ring 7 thus lies only in contact at the support surfaces 8, which move elastically in the direction of the slit 22 lying behind it during the pressing in. The radial stiffness at a support surface results from the dimensioning of the ring part of the resilient ring 4. Because the axial dimension of support surfaces and resilient ring is considerably smaller than that of the bearing ring 7, inclined positions of the shaft can also be compensated in addition to thermal expansion differences of the different materials since the actual ring part can be set at an inclination more easily in narrow resilient rings. In this way, it is possible to clamp in the bearing ring 7 in a relatively hard manner via the drawing and bending forces which are produced in the resilient ring 4 and nevertheless to allow inclined positions of the shaft. The bearing sleeve 1 which is shrunk into the bearing ring 7 can consist of silicon carbide, metal oxide or sintering materials.

In FIGS. 3 and 4, the shaft part 3, the bearing sleeve 1 and the support ring 7 are designed the same as in the preceding example. Only the bearing ring 7 engages into a rotational securing 11 relative to the support ring 5. The rotational securing 11 must allow permissible shaft displacements. The support ring 5 and the resilient ring 4 are axially displaced with respect to one another. Bridges 6 and slits 22 are uniformly distributed over the periphery. The bridge parts 6 adjoin radially outwardly at the resilient ring 4 and merge into the support ring due to the displacement of the actual support ring 5 in the axial direction. In the manufacturing technique, the bridges 6 arise through the milling out of pockets 25 and the slits 22 through additional overlapping with the contour of a puncture 28 on the opposite side. Between the bridges 6, which project into the housing, and the housing bore 15, there is a radial clearance 29 which permits a radial orientation of the bearing sleeve 1 and the support ring 5 by means of four centering screws 19 which are displaced by 90°. After the orientation, the support ring 5 is fastened to the housing wall 24 with screws 21. In FIG. 5, a pressed in pin is fastened to the support ring 5 with a separate holder ring as a rotational securing 11, whereas the support ring 5 is bored through with the housing and pinned to it via pins 23 after the centering. In FIG. 6 the support surfaces 8 and the jacket surface 13 of the bearing ring 7 are executed not as subsurfaces of a same cylinder but rather as subsurfaces of a same cone 14, the half cone angle 27 of which amounts to less than 5°. With a measure of this kind the bearing ring 7 can be pressed in without the otherwise necessary large temperature differences in the resilient ring 4. The separate flange 12 with the rotational securing 11 serves at the same time as securing in the axial direction. In these examples, the bearing material is applied only as a thin layer 10 to the bearing sleeve 1, which is centered directly by the resilient ring 4.

A further possibility for a rotational securing is shown in FIG. 7. The rotational securing 11 consists of one or more screw bolts which in each case protrude into a cut-out 30 such as groove or blind bore at the bearing ring in the region of a bridge 6. In this example, a further possibility is shown of making the clamping in of the bearing ring 7 softer. The support surfaces 8 are radially slit here so that two leaf-shaped bending springs arise in the ring part 4 and the drawing forces are absent in the pressing in of the bearing ring 7. This consideration can be led further to an example in accordance with FIG. 8 in which these bending springs and the slits are repeated in a large number at the inner diameter of the outer part 2 in an inclined position to the radial. There arises a large number of support surfaces 8 with a bending spring which is produced by saw cuts 22 in each case. The stronger the inclination of these bending springs away from the radial to the tangential at the bearing ring 7 turns out, the better the support surfaces 8 can follow inclined positions of the shaft axis 16.

What is claimed is:

1. A liquid lubricated radial sliding bearing comprising a bearing sleeve of wear resistant bearing material which is elastically fastened in an outer part and which forms an elastic journalling with a shaft part which can follow thermal heat expansions and inclined positions of the shaft to a limited extent, wherein the bearing material is fastened in a bearing ring; and wherein the outer part is formed in a single part to a resilient ring and a support ring, with the resilient ring being braced at the support ring by bridges which are distributed over its periphery and in turn having resilient support surfaces which are directed inwardly at which the bearing ring lies in contact under a bias force.

2. A sliding bearing in accordance with claim 1 wherein the resilient ring is a ring which is closed uninterruptedly.

3. A sliding bearing in accordance with claim 1 wherein the bridges extend in the radial direction between the resilient ring and the support ring.

4. A sliding bearing in accordance with claim 1 wherein the bridges extend in the axial direction between the resilient ring and the support ring.

5. A sliding bearing in accordance with claim 1 wherein the bearing material consists of hard material parts or ceramic parts which are shrunk in into the bearing ring in order to produce a pressing stress.

6. A sliding bearing in accordance with claim 1 wherein the bearing material is applied as a wear resistant layer to the bearing ring and the latter is directly centered in the resilient ring.

7. A sliding bearing in accordance with claim 1 wherein a rotational securing is provided between the outer part and the bearing ring.

8. A sliding bearing in accordance with claim 1 wherein a separate holder ring secures the bearing ring axially.

9. A sliding bearing in accordance with claim 8 wherein support surfaces and the jacket surface of the bearing ring have a common conical jacket surface in order to produce a bias force between the bearing ring and the support surfaces when the bearing ring dips in.

10. A sliding bearing in accordance with claim 1 wherein the outer part is designed as a built in flange which can be fastened in housing bores.

11. A sliding bearing in accordance with claim 10 wherein the support ring can be moved into the housing bore with a radial clearance; and wherein its exact radial position can be set by centering screws before it is definitively fastened to the housing.

12. A pump for forwarded liquids comprising a bearing in accordance with claim 1 which is lubricated by the forwarded liquid.

\* \* \* \* \*